(12) United States Patent
Mizelmoe

(10) Patent No.: US 8,317,455 B2
(45) Date of Patent: Nov. 27, 2012

(54) DEVICE AND METHOD FOR REMOVING A BUNDLE FROM A HEAT EXCHANGER

(75) Inventor: Leendert Cornelis Mizelmoe, Da Rotterdam (NL)

(73) Assignee: Peinemann Equipment B.V., DB Hoogvliet (NL)

( * ) Notice: Subject to any disclaimer, the term of this patent is extended or adjusted under 35 U.S.C. 154(b) by 355 days.

(21) Appl. No.: 12/616,760

(22) Filed: Nov. 11, 2009

(65) Prior Publication Data

US 2011/0110755 A1   May 12, 2011

(51) Int. Cl.
*B66F 9/18* (2006.01)
(52) U.S. Cl. .................. 414/814; 414/745.3
(58) Field of Classification Search ........... 414/607, 414/659, 661, 745.3, 814, 586, 608, 609, 414/618
See application file for complete search history.

(56) References Cited

U.S. PATENT DOCUMENTS

| | | | |
|---|---|---|---|
| 2,920,917 A | | 1/1960 | Sheehan |
| 3,180,498 A | * | 4/1965 | Postlewaite .............. 29/726.5 |
| 3,239,077 A | | 3/1966 | Huff et al. |
| 3,257,001 A | * | 6/1966 | Postlewaite et al. ........ 29/726.5 |
| 3,719,296 A | * | 3/1973 | Larson, Jr. ................ 414/422 |
| 3,897,969 A | * | 8/1975 | Dike ....................... 294/118 |
| 3,954,187 A | | 5/1976 | Van Der Woerd |
| 4,227,854 A | * | 10/1980 | Coffey ..................... 29/726.5 |
| 4,575,305 A | * | 3/1986 | Krajicek et al. .......... 414/744.3 |
| 5,203,072 A | * | 4/1993 | Boisture .................. 29/726.5 |
| 5,322,410 A | | 6/1994 | Persinger et al. |
| 5,364,147 A | | 11/1994 | Dickey et al. |
| 5,979,961 A | | 11/1999 | Carey |

* cited by examiner

*Primary Examiner* — Saul Rodriguez
*Assistant Examiner* — Glenn Myers
(74) *Attorney, Agent, or Firm* — Gordon & Rees LLP

(57) ABSTRACT

Device for removing a bundle from the casing of a heat exchanger, comprising a carrier frame provided with pulling means for removing the bundle from the casing, wherein the carrier frame is adapted to hold the bundle removed from the casing, wherein the device is provided with hoisting means for hoisting the carrier frame, wherein the hoisting means comprise at least one gripper and wherein the device is also provided with connecting means for connecting the gripper releasably to the carrier frame.

5 Claims, 3 Drawing Sheets

DEVICE AND METHOD FOR REMOVING A BUNDLE FROM A HEAT EXCHANGER

SUMMARY OF THE INVENTION

The invention relates to a device for removing a bundle from the casing of a heat exchanger, comprising a carrier frame provided with pulling means for removing the bundle from the casing, wherein the carrier frame is adapted to hold the bundle removed from the casing, wherein the device is provided with hoisting means for hoisting the carrier frame. The invention also relates to the carrier frame and a method for removing and re-placing a bundle respectively from and into a heat exchanger.

Such a device is generally known.

Frequent use is made, particularly in the petrochemical industry, of heat exchangers for the purpose of cooling fluid flows. A much used heat exchanger is a tube heat exchanger consisting substantially of a bundle of tubes enclosed by a casing. For instance during cleaning of the tube bundle or when the heat exchanger breaks down, it is necessary for the bundle to be removed from the casing in order to make the bundle accessible for the purpose of for instance cleaning or repair.

A much used device for this purpose is the liftable bundle extractor. This device comprises a carrier frame on which pulling means are arranged for the purpose of pulling the bundle out of the casing. This carrier frame is provided with hoisting means, for instance a hoisting frame provided with a hoisting eye for connecting the carrier frame to a crane, with which the carrier frame can be hoisted in the line of a heat exchanger. The carrier frame is connected to the casing and, using the pulling means, for instance a unit displaceable in lengthwise direction of the carrier frame, the bundle is pulled onto the carrier frame. The carrier frame is adapted here to hold the bundle when it has been pulled out of the casing. The bundle extractor is then lifted to a ground surface with the crane, after which the bundle can be further processed.

Although mention is made in this context of a pulling means, it should be appreciated that these pulling means are also able to slide the bundle back into a casing, wherein the above described process is performed in reverse sequence.

It is a drawback of the known device that the bundle cannot be easily removed from the carrier frame once it has been pulled out of the casing, since the hoisting frame is generally connected to the carrier frame on either side of the picked-up bundle, wherein the bundle as it were extends between the legs of the hoisting frame. The bundle becomes accessible for further processing by for instance displacing the hoisting frame in lengthwise direction of the carrier frame.

The present invention has for its object to provide an efficient, versatile, inexpensive and/or simple device for removing a bundle from the casing of a heat exchanger, wherein the drawback of the prior art is at least partly obviated.

The device of the type stated in the preamble has for this purpose the special feature that the hoisting means comprise at least one gripper and that the device is also provided with connecting means for connecting the gripper releasably to the carrier frame. Using this device, which comprises a carrier frame and a gripper, it is possible, once the bundle has been pulled onto the carrier frame and for instance re-placed on a ground surface, to uncouple the gripper from the carrier frame and to subsequently engage the just removed bundle with this gripper and to further process this bundle, wherein the bundle is hoisted separately of the carrier frame. It will be apparent to the skilled person that this considerably improves the efficiency of the bundle extraction process.

The present invention moreover makes unnecessary the use of a separate crane for hoisting the bundle extraction device, since hoisting of the carrier frame with the pulling means can take place using for instance a conventional gripper.

In a preferred embodiment of the device according to the invention the gripper comprises at least two gripping arms and the gripper is connected to the carrier frame close to the outer ends of the gripping arms. The gripping arms here as it were close round the carrier frame, wherein the carrier frame extends in connected position between the outer ends of the gripping arms. Since the gripper is preferably adapted to engage a bundle, and the dimensions of the gripping arms at least substantially correspond for this purpose to the size of the bundle to be picked up, a compact assembly is in this way obtained.

In a further preferred embodiment of the device according to the invention the connecting means comprise at least one engaging surface, wherein the engaging surface is adapted to be engaged by the gripper. The connection between the gripper, in particular the outer ends of the gripping arms, and the carrier frame takes place here with co-acting surfaces of the gripper and the engaging surface. For this purpose the inward facing surface of the gripper is preferably at least substantially complementary to the engaging surface. Inward facing must in this respect be understood to mean the surface of the gripper, in particular the gripping arms, with which the gripper engages an object in normal use. A strong and simple connection is obtained when the surface of the gripper and the engaging surface are of at least substantially the same form, and so fit closely together.

The connecting means preferably comprise at least two engaging surfaces, wherein each of the engaging surfaces is adapted to be engaged by a gripping arm. In this embodiment an engaging surface is provided for each gripping arm, preferably the outer ends thereof. The engaging surfaces more preferably extend on the lateral sides of the carrier frame. The carrier frame can in this way be clamped between the gripping arms of the gripper, whereby a strong connection between the gripper and the carrier frame is obtained.

In a further preferred embodiment of the device according to the invention at least the outer ends of the gripping arms are provided with carriers, wherein the carriers are adapted to engage the carrier frame. Such carriers preferably extend in the lengthwise direction of the carrier frame so that the gripper has a larger surface area on which to engage an object, in particular the engaging surfaces of the carrier frame or a bundle of a heat exchanger. The inward facing surfaces of the carriers are preferably at least substantially complementary to the engaging surfaces for the purpose of obtaining a strong connection.

Although a strong and reliable connection is already obtained by clamping the carrier frame between the gripper, in particular between the gripping arms and more particularly engaging the lateral engaging surfaces using the carriers mounted on the gripping arms, additional securing of the connection between the gripper and the carrier frame is possible. In a further preferred embodiment of the device according to the invention the connecting means comprise locking means for this purpose. It is possible here to envisage locking pins arranged through both the gripper and the carrier frame. It can also be advantageous to arrange pins on the carrier frame, in particular on the engaging surface, with a somewhat conical form, wherein the gripper is provided with a passage for receiving this pin. The conical form can then also serve as guide in attaching of the gripper to the carrier frame. It will be apparent to the skilled person that the pin can also be arranged on the gripper.

In a further preferred embodiment of the device according to the invention the connecting means comprise balancing means for balancing the carrier frame. The balancing means are preferably adapted to displace the position of engagement of the gripper on the carrier frame in the lengthwise direction of the carrier frame. The engaging surfaces are preferably displaceable for this purpose in the lengthwise direction of the carrier frame. The carrier frame can in this way always be brought into balance, irrespective of the type of bundle held on the carrier frame.

In a further preferred embodiment of the device according to the invention the gripper comprises:
- at least a first and a second gripping arm, at least one of which is movable relative to the other in order to enclose at least one object at a time therebetween; and
- a drive connected to at least one of the first and the second gripping arm for closing or opening the gripper as required, wherein at least one of the first and the second gripping arm comprises a first gripping arm part and a second gripping arm part, which first and second gripping arm parts are connected rotatably to each other and an adjusting mechanism between the first and second gripping arm parts, wherein the adjusting mechanism is adapted to adjust, prior to engagement, the angle between the gripping arm parts to the diameter of the object to be engaged.

Such a gripper is highly suitable for connection to the carrier frame according to the invention, since the distance and orientation of the gripping arm parts can be precisely set by means of the adjusting mechanism before either the carrier frame or the bundle itself is engaged. A strong connection between the carrier frame or the bundle is in this way ensured.

The invention also relates to a carrier frame provided with pulling means for removing a bundle from a casing of a heat exchanger, and wherein the carrier frame is adapted to hold the bundle removed from the casing, wherein the carrier frame is provided with hoisting means for hoisting the carrier frame, wherein the hoisting means comprise connecting means for connecting a gripper releasably to the carrier frame.

The invention further relates to a method for removing the bundle from the casing of a heat exchanger, comprising the steps of:
- hoisting a carrier frame close to the heat exchanger by means of a gripper;
- engaging and removing the bundle from the casing, wherein the bundle is pulled onto the carrier frame;
- placing the carrier frame holding the bundle onto a ground surface;
- uncoupling the gripper and the carrier frame; and
- engaging and hoisting the bundle from the carrier frame by means of the gripper.

Using the above described method a core or bundle pulled out of the casing of a heat exchanger can be further displaced rapidly and efficiently using the gripper without an additional crane being necessary for this purpose. The gripper is uncoupled from the carrier frame and the gripping arm parts of the gripper are preferably then adjusted for the purpose of engaging the bundle itself.

In a preferred embodiment of the method according to the invention the gripper is connected to the carrier frame before hoisting the carrier frame to the heat exchanger. It is advantageous here that the gripper, prior to the extraction of a bundle from a heat exchanger, can have been employed in other hoisting operations separately of bundle extraction.

In a preferred embodiment of the method according to the invention the connecting comprises of clamping the carrier frame between the gripping arms of the gripper. The gripper is preferably adapted for presetting of the mutual distance and orientation of the gripping arm parts to the size of the carrier frame, whereby a close-fitting connection is obtained between carrier frame and gripper. In this embodiment the connection is obtained by the clamping action of the gripping arms, preferably in combination with the co-acting engaging surfaces as discussed above. It is moreover advantageous to block the relative position of the gripping arm parts after connection to the carrier frame.

In a further preferred embodiment of the method according to the invention the connecting of the gripper to the carrier frame comprises of connection using locking means. An additional securing is in this way provided.

The invention further relates to a method for placing the bundle in the casing of a heat exchanger, comprising the steps of:
- engaging and hoisting the bundle by means of the gripper;
- placing and releasing the bundle onto a carrier frame;
- engaging and connecting the carrier frame holding the bundle to the gripper;
- hoisting a carrier frame close to the heat exchanger by means of the gripper;
- pushing the bundle into the casing, wherein the bundle is pushed off the carrier frame.

As in the case where the removal of a bundle from a casing of a heat exchanger is discussed, it is also very efficient and simple with the present invention to place a bundle in a casing.

The invention will be further elucidated with reference to figures shown in the drawing of an exemplary embodiment of the device according to the invention, in which:

DETAILED DESCRIPTION OF THE DRAWINGS

Figure 1:
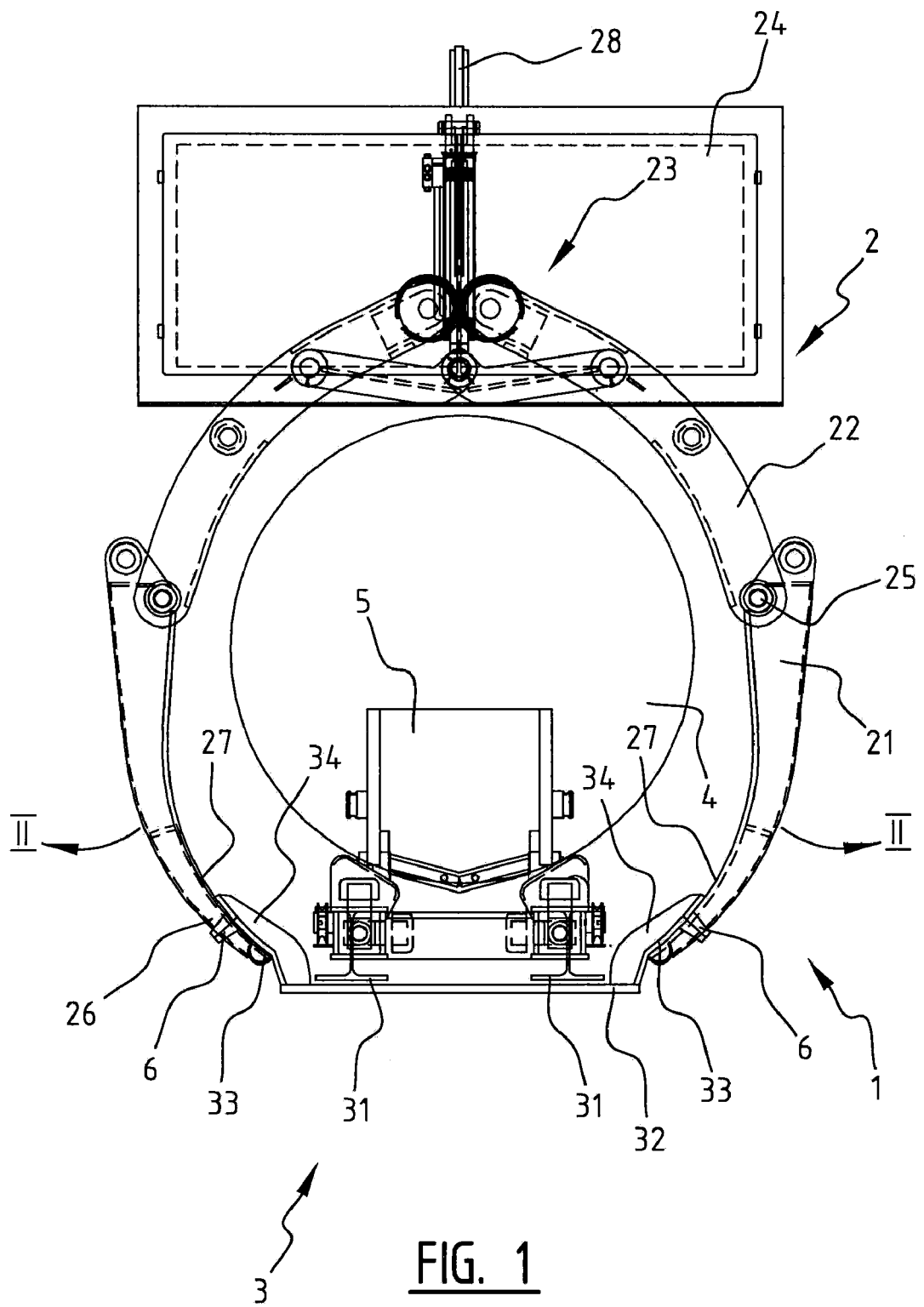
FIG. 1 shows a schematic cross-section of a device according to the invention.
Figure 2:
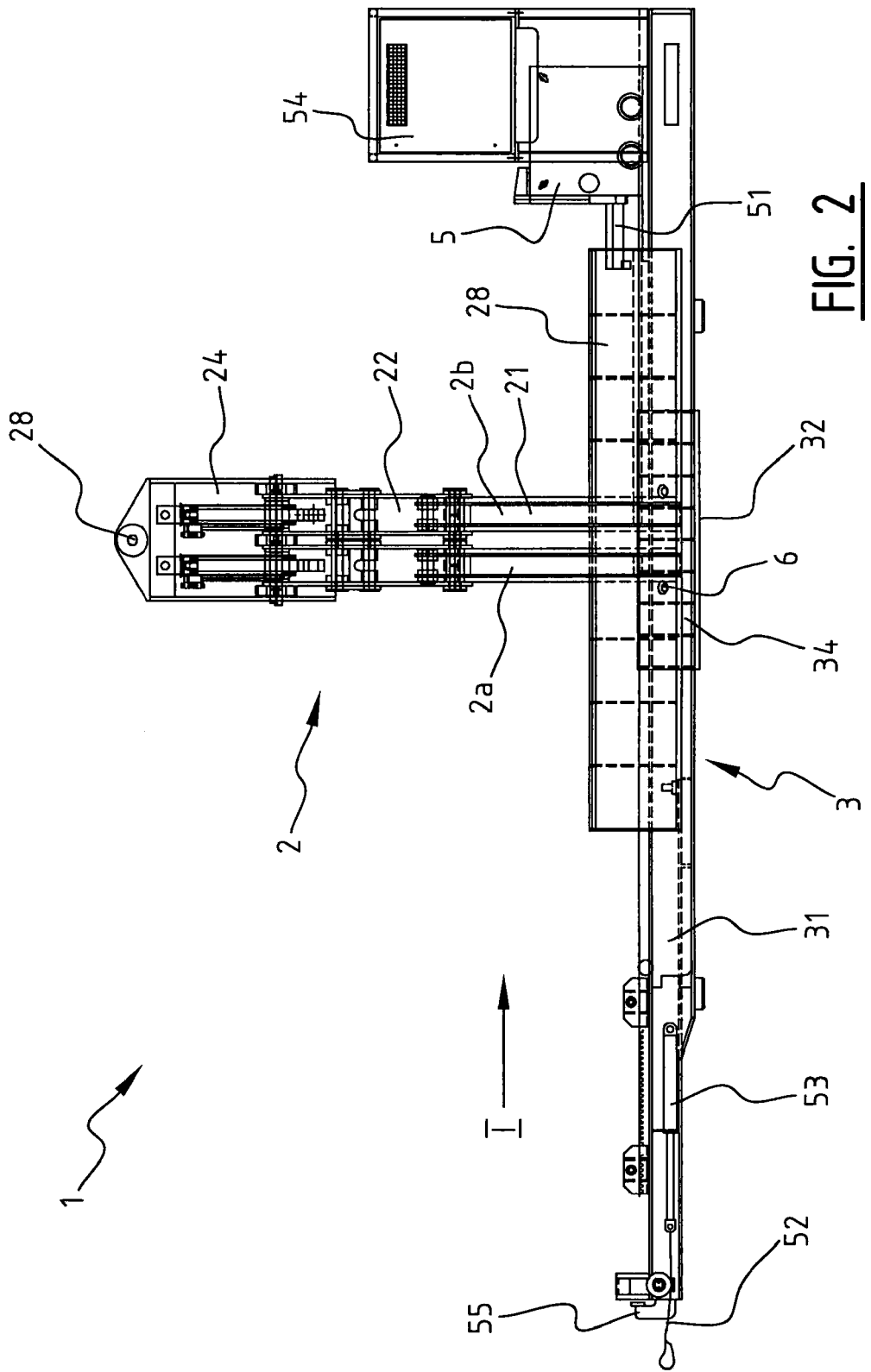
FIG. 2 shows a schematic side view of the device according to the invention.
Figure 3:
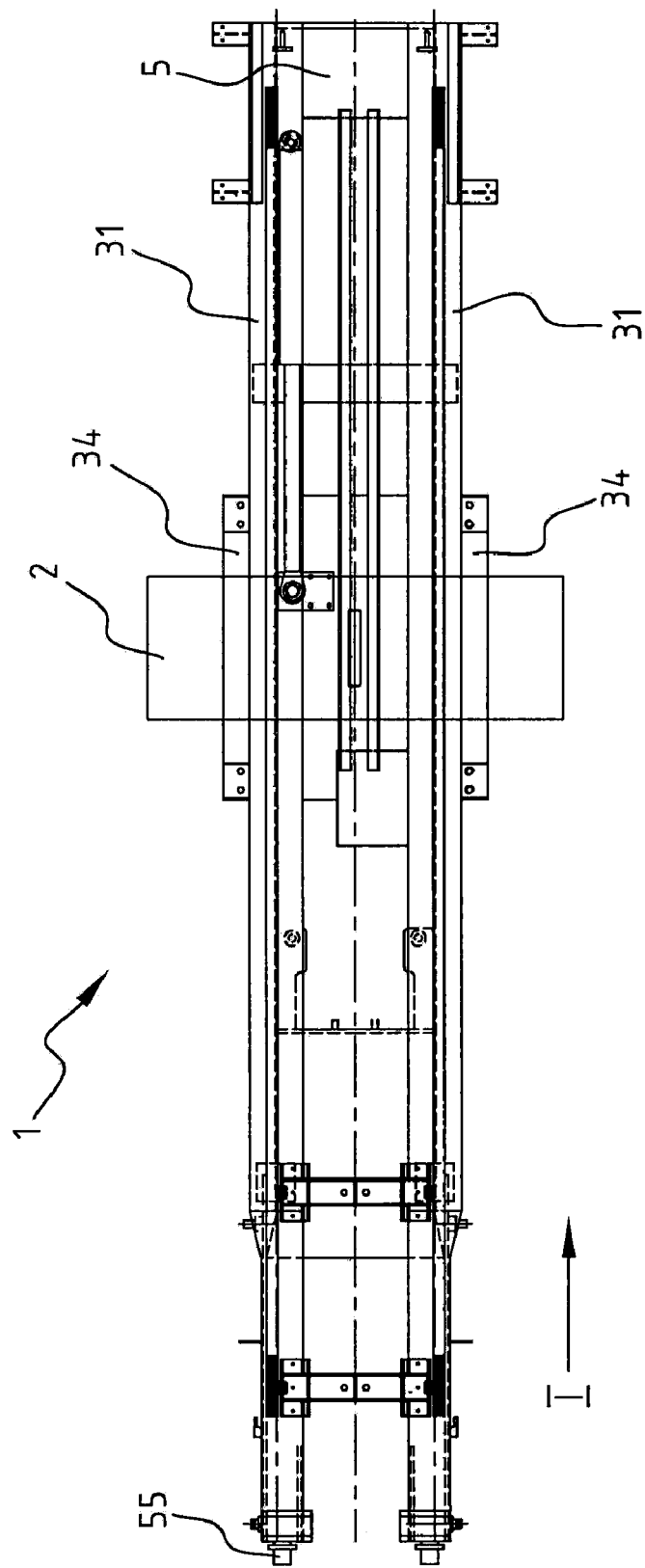
FIG. 3 shows a schematic top view of the device.

FIGS. 1-3 show an exemplary embodiment of the device in the form of a bundle extractor 1 according to the invention. Device 1 comprises a gripper 2, which in this embodiment comprises two separate gripper is 2a, 2b as shown in FIG. 2 and a carrier frame 3 in the form of a support frame 31. Carrier frame 3 is equipped with pulling means, in this embodiment in the form of a pulling carriage 5 displaceable over frame 31 in a direction I. Frame 31 is adapted such that carriage 5 can move over the frame, for instance with rails. Energy sources 54, in this embodiment in the form of a diesel engine, are provided for driving pulling, carriage 5 and other components.

Also provided on the side of support frame 31 hoisted close to a heat exchanger are traction cables 52 which are fixed to the casing of the heat exchanger and which can then be tightened with pneumatic pistons 53 for the purpose of fixing support frame 31 relative to the heat exchanger for handling.

Using the pulling means in the form of pulling carriage 5 a bundle 4, shown schematically in FIG. 1, is pulled out of the heat exchanger in direction I using a clamping device 51 and other components, wherein bundle 4 is received on support frame 31. For this purpose pulling carriage 5 is first displaced in the direction of the heat exchanger (in a direction opposite to direction I) and, after coupling, displaced in a direction I, thereby pulling the bundle out of the casing. It should be noted that, although reference is made here to a pulling carriage 5, this pulling carriage 5 is also able to push a bundle into a casing in the opposite direction.

In this exemplary embodiment gripper 2 comprises two gripping arms 2a, 2b, each comprising two gripping arm parts 21, 22. The relative position of gripping arm parts 21, 22 to each other is adjustable, whereby the gripper can be adapted to the object for engaging, in particular bundle 4 or carrier frame 3. An adjusting mechanism 23 is provided for the purpose of setting the relative position and orientation of gripping arm parts 21, 22. Gripper 2 is also provided with an energy source 24, for instance a diesel engine. Gripper 2 is connected to a crane by means of a cable 28. Also shown in FIG. 2 are carriers 28 which extend in lengthwise direction of carrier frame 3. Such carriers 28 provide for an extra-large contact surface between gripper 2 and carrier frame 3 on the one hand and bundle 4 and gripper 2 on the other.

As shown most clearly in FIG. 1, the lower outer ends 26 of the gripping arms, in this case the lower gripping arm parts 21, clamp the carrier frame 3. Carrier frame 3 is provided for this purpose with connecting means 34 in the form of upright edges. Upright edges 34 each form an engaging surface 33 on which the inward facing surfaces 27 of the gripping arms can engage. As shown, surfaces 33 and 27 fit closely together, whereby a strong connection is obtained between gripper 2 and carrier frame 3. It is important here that the normal to engaging surfaces 33 has a vertical component, so that when the gripping arms are locked, i.e. when the gripping arms with the gripping arm parts are fixed, upright edges 34 rest by means of gravitational force on the lower parts 27, in particular carriers 28, of gripper 2.

The connecting means in the form of upright edges 34 are mounted on a balance plate 32, shown in FIGS. 1 and 2. This balance plate 32 is displaceable in the lengthwise direction of carrier frame 3, parallel to direction I, so that device 1 with bundle 4 can be brought into balance before hoisting by adjusting the position of engagement of the gripper to the centre of gravity of the combination.

Also shown, particularly in FIG. 1, are the locking means in the form of pins 6. Pin 6 has a conical form and can be received in an opening arranged in the lower part 27 of the gripping arm. In addition to such a locking of the connection between gripper 2 and carrier frame 3, such a pin 6 provides aligning means during connection of gripper 2 and carrier frame 3.

Once a bundle 4 has been pulled out of a heat exchanger, carrier frame 3 can be lifted onto a ground surface. When carrier frame 3 is now properly supported, gripper 2 can be uncoupled from connecting means 34. For this purpose the gripping arms are opened in a direction II as indicated in FIG. 1, and gripper 2 can be displaced, wherein carrier frame 3 remains behind. The relative distance and orientation of gripping arm parts 21, 22 can then be adapted to engage bundle 4 directly, i.e. without interposing of carrier frame 3, and hoist it for further processing. Carrier frame 3 here remains behind on the ground surface.

It will be apparent to the skilled person that in similar manner as described above it is also easily possible to hoist a bundle 4 onto a carrier frame 3 using a gripper 2, to detach gripper 2 from bundle 4 and to connect gripper 2 to connecting means 34, after which device 1 can be hoisted close to a heat exchanger for the purpose of inserting bundle 4 into a casing of a heat exchanger.

What is claimed:

1. Method for removing the bundle from the casing of a heat exchanger, comprising the steps of:
    hoisting a carrier frame close to the heat exchanger by means of a gripper;
    engaging and removing the bundle from the casing, wherein the bundle is pulled onto the carrier frame;
    placing the carrier frame holding the bundle onto a ground surface;
    uncoupling the gripper from the carrier frame; and
    engaging and hoisting the bundle from the carrier frame by means of the gripper.

2. Method as claimed in claim 1, wherein the gripper is connected to the carrier frame before hoisting the carrier frame to the heat exchanger.

3. Method as claimed in claim 2, wherein the connecting comprises of clamping the carrier frame between the gripping arms of the gripper.

4. Method as claimed in claim 2, wherein the connecting of the gripper to the carrier frame comprises of connection using locking means.

5. Method for placing the bundle in the casing of a heat exchanger, comprising the steps of:
    engaging and hoisting the bundle by means of the gripper;
    placing and releasing the bundle onto a carrier frame;
    engaging and connecting the carrier frame holding the bundle to the gripper,
    hoisting a carrier frame close to the heat, exchanger by means of the gripper;
    pushing the bundle into the casing, wherein the bundle is pushed off the carrier frame.

* * * * *